Figure 1:
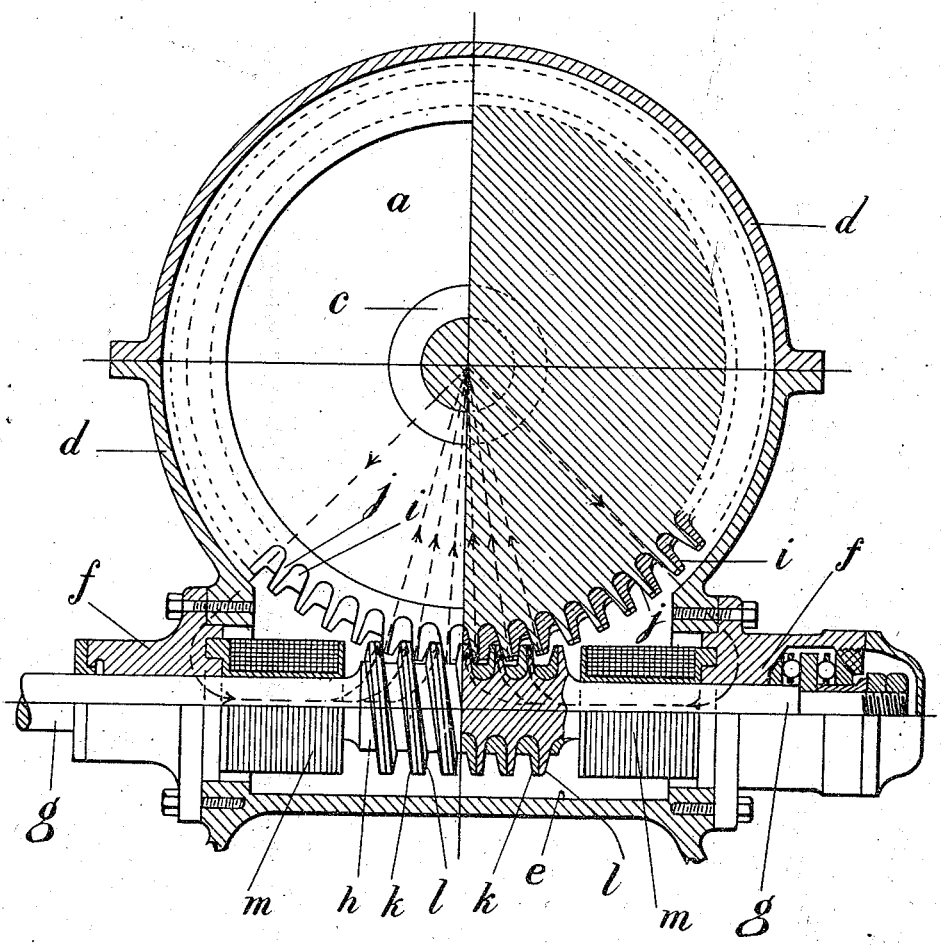

J. LECOCHE.
WORM GEARING.
APPLICATION FILED JULY 9, 1907.

968,574.

Patented Aug. 30, 1910.
2 SHEETS—SHEET 1.

Witnesses
William Crossley
Howard Wilson

Inventor
Jules Lecoche

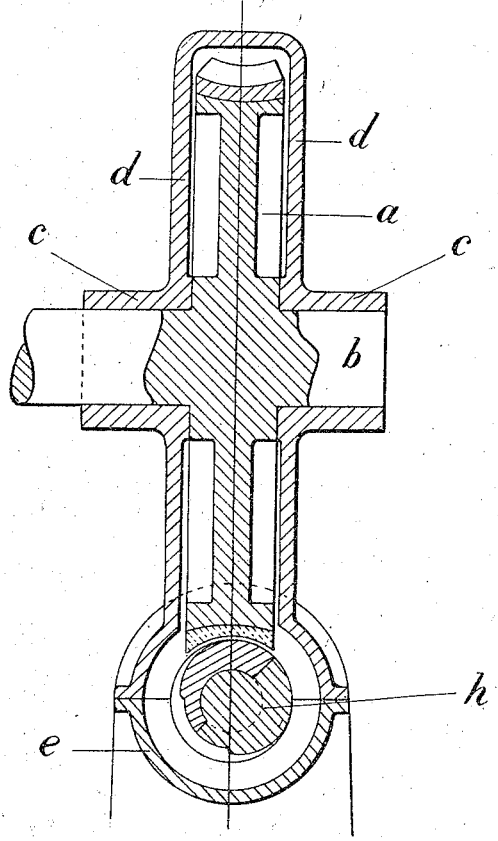

UNITED STATES PATENT OFFICE.

JULES LECOCHE, OF EAST PUTNEY, ENGLAND.

WORM-GEARING.

968,574.  Specification of Letters Patent. Patented Aug. 30, 1910.

Application filed July 9, 1907. Serial No. 382,953.

*To all whom it may concern:*

Be it known that I, JULES LECOCHE, a citizen of the French Republic, residing at 28 Mexfield road, East Putney, in the county of Surrey, in that part of the United Kingdom called England, have invented new and useful Improvements in Worm-Gearing, of which the following is a specification.

This invention relates to improvements in worm-gearing, the object being to increase the efficiency by decreasing the friction which in the ordinary worm gear is so great that from forty to sixty per cent. of the power is lost and subsequently only a comparatively small percentage of efficiency is usefully available. With this invention, however, a much greater efficiency can be obtained thus rendering this type of gear available where it would not otherwise be so. Further, this invention increases the durability of the worm and worm-wheel considerably beyond that of this type of gear as usually constructed which wears out quickly and has frequently to be renewed.

This improved gear is applicable to reducing the speed of turbines, electric and other motors and machines, and to any purpose where an ordinary worm gear would be employed if it had not the defects for which my invention provides a remedy. I do not therefore confine its use to any particular application.

In carrying my invention into effect, I decrease friction and consequent wear and loss of power by diminishing or eliminating between the teeth by transmitting the whole or part of the force necessary to drive the worm-wheel by means of magnetic attraction.

I construct the worm, frame and worm wheel so that a magnetic circuit is formed so that lines of magnetic force pass from the thread of the worm to the teeth of the wheel or vice versa at or about at the points where the magnetic parts of the thread and teeth are in contact.

The required magnetic power is provided either by permanent or electro-magnets, and in the latter case the coils are disposed at suitable points of the magnetic circuit and consequently may be applied to the frame or to the spindle of the worm or to that of the worm-wheel or to any or all of them.

In further explanation of my invention I make reference to the accompanying drawing which shows a practicable and tested form, in which electro-magnetism is made use of, but I do not confine myself to this one form as the details can be varied to adapt the invention to given circumstances without departure from its essential features.

Referring to the drawings, Figure 1 shows a part sectional side view and Fig. 2, a vertical section through the center of Fig. 1.

$a$ is the worm wheel carried by the shaft $b$ running in bearings $c$ which may form parts of a frame or an outer casing $d$, and which in turn may be attached to or form part of a lower part of casing $e$ having bearings $f$ at each end to carry the shaft $g$ of the worm $h$, and the lower part $e$ may contain oil to form an oil bath.

A portion of each of the teeth of the worm wheel $a$ is made of non-magnetic material $i$, the other portion of each tooth being made of magnetic material $j$ as is also the wheel itself with which the magnetic part of the teeth may be integral.

The worm $h$ has a portion of its thread or of each of its threads made of non-magnetic material $k$, the other portion of the thread or threads being made of magnetic material $l$. The worm shaft $g$ runs in two magnetic coils $m$ attached to the end of the casing $e$ and connected with a suitable source of electricity. The framing or casing in which are arranged the worm-gearing should be of good magnetic permeability so that the whole will form a magnetic circuit.

In use when the worm is revolved so as to rotate the worm wheel in the direction of the arrow, and an electric current circulates through the coils, the magnetic part of the thread of the worm in contact with the magnetic part of a tooth of the worm wheel drives the said tooth by attraction and if the current is of the proper intensity the total force necessary for driving the wheel can be transmitted by magnetic attraction and if the force of this attraction is just sufficient to overcome the resistance to the turning of the worm wheel all friction between the worm and worm-wheel would theoretically be eliminated. The coils $m$ may be elsewhere and otherwise arranged than shown on the drawing, and for the casings may be substituted a suitable framing, and for the coils permanent magnets.

What I claim and desire to secure by Letters Patent is:—

1. The combination with a worm gearing, of means for transmitting the driving force by magnetic attraction.

2. In a worm gearing the combination of a worm having a portion of each of its threads of non-magnetic material and a portion of magnetic material; magnets in which the shaft of the worm can revolve, a worm-wheel gearing with the said worm and having portions of its teeth of non-magnetic material and portions of magnetic material, the whole arranged so that the lines of magnetic force pass from the worm to the worm-wheel about at the points of contact between the worm threads and the worm-wheel teeth.

In testimony whereof I have signed my name to the above specification in the presence of two subscribing witnesses.

JULES LECOCHE.

Witnesses:
H. D. JAMESON,
F. L. RAND.